United States Patent [19]

Koljonen et al.

[11] Patent Number: 5,581,632
[45] Date of Patent: Dec. 3, 1996

[54] METHOD AND APPARATUS FOR BALL BOND INSPECTION SYSTEM

[75] Inventors: Juha Koljonen, Needham; David J. Michael, Newton, both of Mass.

[73] Assignee: Cognex Corporation, Natick, Mass.

[21] Appl. No.: 236,213

[22] Filed: May 2, 1994

[51] Int. Cl.⁶ ........................................... G06K 9/46
[52] U.S. Cl. .......................... 382/150; 382/168; 382/291
[58] Field of Search ................................. 382/8, 41, 30, 382/33, 34, 146, 150, 168, 209, 291, 286, 194; 348/126

[56] References Cited

U.S. PATENT DOCUMENTS

| | | |
|---|---|---|
| 4,240,750 | 12/1980 | Kurtz et al. . |
| 4,347,964 | 9/1982 | Takasugi et al. . |
| 4,421,410 | 12/1983 | Karasahi . |
| 4,439,010 | 3/1984 | Doty . |
| 4,441,248 | 8/1984 | Sherman et al. . |
| 4,567,610 | 1/1986 | McConnell ................... 382/30 |
| 4,731,863 | 3/1988 | Sezan et al. ................. 382/51 |
| 4,799,175 | 1/1989 | Sano et al. . |
| 4,855,928 | 8/1989 | Yamanaka . |
| 5,030,008 | 7/1991 | Scott et al. ................... 382/8 |
| 5,138,180 | 8/1992 | Yamanaka . |
| 5,156,319 | 10/1992 | Shibasaka et al. . |
| 5,170,062 | 12/1992 | Miyahara . |
| 5,204,911 | 4/1993 | Schwartz et al. ............. 382/30 |
| 5,225,891 | 6/1993 | Choumei . |

OTHER PUBLICATIONS

Kimme et al. "Finding Circles by an Array of Accumulators." Comm. of the ACM, vol. 18, No. 2, pp. 120–122, Feb. 1975.

O'Gorman et al. "Subpixel Registration Using a Concentric Ring Fiducial" Proc. 10th Int. Conf. Pat. Rec., vol. 2, pp. 249–253, Jun. 1990.

Primary Examiner—Joseph Mancuso
Assistant Examiner—Jon Chang
Attorney, Agent, or Firm—Maureen Stretch

[57] ABSTRACT

The invention automatically inspects the bond of a wire to a contact pad on a semiconductor chip. The apparatus includes a movable platform for holding semiconductor chips situated in lead frames; a video camera for sensing images; illumination means for illuminating a chip in a lead frame; an image processor to digitize and analyze the images; a bonding mechanism; and a host controller electronically connected to bonding mechanism, movable platform, video camera, and image processor. Image processor locates a bond on a pad in a digitized image and provides a first nominal center of ball bond image. The invention aligns the center of a polar coordinate transform image having one or more segments with the nominal center of ball bond image and evaluates ball bond image using the polar coordinate transform image to create a polar projection histogram array and store it. An edge filter is applied to histogram array to detect peaks and store their number and values. Polar coordinate transform image is aligned with a next nominal ball center location until a predetermined number of potential ball center locations is exhausted. The maximum peak in the list of stored peaks is selected as the radius of bond from which the size and position of bond is computed and reported to host controller for further action.

6 Claims, 8 Drawing Sheets

Image of ball bond on bonding pad with wire

Fig. 8
Plot of normalized polar projection from center of ball
Fig. 9
Plot of normalized polar projection with center offset from center of ball
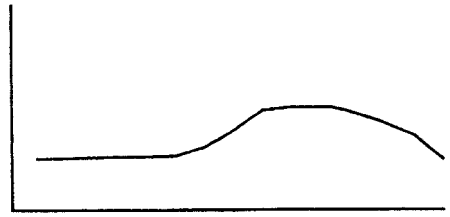
Fig 10. - First derivative of Fig. 8
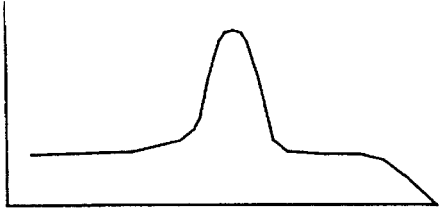
← Radius of ball →
Fig. 11
First derivative of Fig. 9
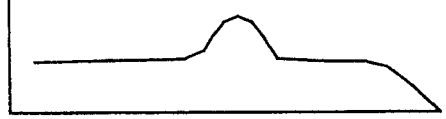

METHOD AND APPARATUS FOR BALL BOND INSPECTION SYSTEM

BACKGROUND OF THE INVENTION

A. Field of the Invention.

This invention relates generally to machine vision systems and semiconductor chip wire bonding devices, and similar bonding apparatus, and particularly to a method and apparatus for performing automated optical inspection of a wire bond formed on a contact pad of a semiconductor chip. In order to perform an automated, in-process inspection of the ball bonds formed by the wire bonder, a system must first locate each bond formed on a chip before an inspection can take place. Applicants' Assignee's Co-pending United States patent applications:

Automated Optical Inspection Apparatus, filed 06 Oct. 1993, Ser. No. 08/132,532; and Automated Optical Inspection Apparatus Using Nearest Neighbor Interpolation, a continuation-in-part of the latter, filed 30 Apr. 1994, Ser. No. 08/236,215; and Method and Apparatus for Aligning Oriented Objects, a continuation-in-part of the latter, filed 03 Jan. 1995, Ser. No. 08/367,478; and Using Cone Shaped Search Models for Solder Ball Location filed 30 Apr. 1994, Ser. No. 08/236,211; describe systems for locating the nominal placement of a bond with sufficient speed and accuracy to permit an inspection of bond size and position to occur.

B. Background.

Semiconductor devices, such as integrated circuit chips, are electrically connected to leads on a lead frame by a process known as wire bonding. The wire bonding operation involves placing and connecting a wire to electrically connect a pad residing on a die (semiconductor chip) to a lead in a lead frame. Once all the pads and leads on the chip and lead frame have been wire bonded, it can be packaged, often in ceramic or plastic, to form an integrated circuit device. In a typical application, a die or chip may have hundreds or thousands of pads and leads that need to be connected.

There are many types of wire bonding equipment. Some use thermal bonding, some use ultra-sonic bonding and some use a combination of both. A post-process inspection step, commonly called the third optical inspection, typically involves locating and inspecting the position and size of all bonds on the device, the wire connections and the wire heights using optical means to insure that a good connection was created by the bond. This is done after wire bonding is complete and before encapsulation of the integrated circuit.

Heretofore the third optical inspection has been accomplished only after the device is completely bonded and sent to a separate machine or operator, but most usually by a human operator using a microscope. The inspection is often done on a sampled basis. While sampling reduces the number of inspections, bad connections may be missed.

Vision systems or image processing systems (systems that capture images, digitize them and use a computer to perform image analysis) are used on wire bonding machines to align devices and guide the machine for correct bonding placement, but have heretofore not been used during the process for inspection purposes. Separate machines are available to perform inspections outside of and after the bonding process, but this requires another piece of capital equipment in the production line.

Bonds formed on the contact pad of the semiconductor chip are inspected to insure that their placement and size are within specified tolerances. In actual application in the field, almost all of these wirebond inspections are done manually. Manual inspection is very slow. Expensive parts may need to be inspected 100% on an individual basis, rather than sampled, and if this is done manually as well, this can further reduce productivity and add to costs.

While proprietary machines sold by Canon and Shinkawa are known to be available to inspect wire bonds, these are believed to operate only as post bond inspection systems. As a result, defective bonds may not be detected until later in the assembly process or after its completion. Productivity is thus lowered, and some defective bonds may not be detected at all.

Even when the location of a ball bond can be found quickly, however, one of the major problems both with in process or post process systems with trying to locate and measure ball bond edges in an image is the large number of confusing edges present. These are due to the circuitry, probe marks and bond pads in the image. Most semiconductor chips have a considerable amount of visual detail (such as the images of the circuits themselves) which must be circumvented in analyzing the post-bond image to find the bond edges. Some of this detail can be mistaken for parts of the bonds. Visual imperfections on the pads caused by probe marks, discoloration, or imperfect illumination further complicate these difficulties.

Existing techniques for locating circular or elliptical edges such as those formed by ball bonds on circuit pads, while they may be accurate, are often too slow to permit their use in an in-process inspection system.

SUMMARY OF THE INVENTION

The invention comprises a method and apparatus for measuring the size and position of bonds 09 made by wire bonding machines in the semiconductor assembly process. The invention calculates measurements from digitized images of the ball bonds 09, which have been captured by a video camera 04 and then digitized to form an array of pixels in computer memory.

In one preferred embodiment, the apparatus constructs a rectangular to polar coordinate transform image 60 having an image size and radius value at least equal to the maximum size and radius values of the expected ball bond to be inspected. In another preferred embodiment the polar coordinate transform image 60 is created with multiple segments 65. Ball bond image 70 and a nominal location of its center are obtained from the image processor 06 according to the methods and apparatus of the above-referenced pending U.S. patent applications. Polar coordinate transform image 60 is aligned with the nominal location of the ball bond center. Ball bond image 70 is evaluated by creating a one-dimensional polar projection histogram array using the polar coordinate transform image 60 to index through the array for storing and normalizing the histogram results. An edge filter is applied to the projection to locate peaks, whose number and location for that nominal center are stored. The invention repeats the alignment, evaluation, edge filtering and peak storing steps on a next potential ball center location until some specified number of potential locations have been evaluated. The maximum peak is detected from all locations evaluated, and that peak is used as the radius of the ball bond. Size and position of bond 09 are computed from the radius of a ball bond image 70 having the maximum peak and are passed as signals to host controller 08 for further action in the assembly process.

It is an aspect of the present invention that it performs a fast rectangular to polar coordinate transform of the bond image pixels, to minimize processing time spent in inspection. This transform is used to generate a one dimensional projection or accumulation array, histogram array 80 that contains the sums of all of the pixels under each radius from a center point. It is a projection along the R dimension in polar coordinates. Two operations, edge filtering and peak detection, are then run on this one dimensional array to calculate the position of image edges that are then presumed to be the edges of the ball bonds. The location of an edge in histogram array 80 corresponds to the radius of a circle. Peaks found for each projection are stored in a list, along with their values.

It is an object of the present invention to locate the center of ball bonds in a digitized image. The above transform and radius calculation is applied at a number of possible center points or ball center locations in a ball bond image 70. The best circle fit occurs at the center point where the slope of an edge in the one dimensional accumulation array is maximized. The peaks located for each possible ball center location are evaluated and the maximum peak is selected as the radius of the ball bond.

It is another feature of the present invention that it can calculate ball bond sizes for elliptical balls that have different X and Y sizes. To provide such information, the invention creates a polar coordinate transform image having multiple segments that are normalized so that one evaluation step will produce a polar projection array corresponding to each segment. The segments, in turn, are associated with x and y directions and dimensions in Cartesian coordinates.

In a preferred embodiment, Applicant's Assignee's Cognex Corporation VC-1 image processing chip, described in U.S. Pat. No. 4,972,359, is used to maximize the speed of the creation of the polar projections. Using this image processing chip, an entire projection can be done in the time that it takes to access the nominal ball center location image and polar coordinate transform model pixels from memory—as each pixel in a column in the image is accessed, it is automatically summed into a polar projection by the VC-1 image processing system.

It is also a feature of a preferred embodiment invention that the one dimensional polar projection and the transformation of the image coordinates from rectangular to polar coordinates are done in one evaluation of the pixels in the image, rather than in two separate steps. This is accomplished through the use of the VC-1 chip.

It is another feature of the present invention that using polar projections minimizes confusing edges, since polar projection techniques tend to detect only circular objects in the image. Square or rectangular objects such as the bond pads or their edges, will consequently not be seen as sharp edges in the filtered projection array, since a polar projection of such objects tends to blur the pad edge.

It is an another aspect of the present invention that it maximizes computational speed and minimizes memory requirements to keep costs associated with construction and use reasonable. An automated, in process inspection is much faster than a manual one, and allows the inspection of a far greater percentage of ball bonds. For those expensive parts that must be inspected 100%, the throughput of part production can be increased significantly.

BRIEF DESCRIPTION OF THE DRAWINGS

FIG. 8 is a plot of normalized polar projection of a nominal ball center location according to the present invention.

FIG. 9 is a plot of normalized polar projection of a nominal ball center location having a center offset from the actual center of the ball bond.

FIG. 10 is a plot depicting a first derivative of the normalized polar projection of FIG. 8, after an edge filter has been applied.

FIG. 11 is a plot depicting a normalized polar projection of FIG. 9, in which the nominal ball center location has a center offset from the actual center.

DETAILED DESCRIPTION OF THE INVENTION

Figure 1:
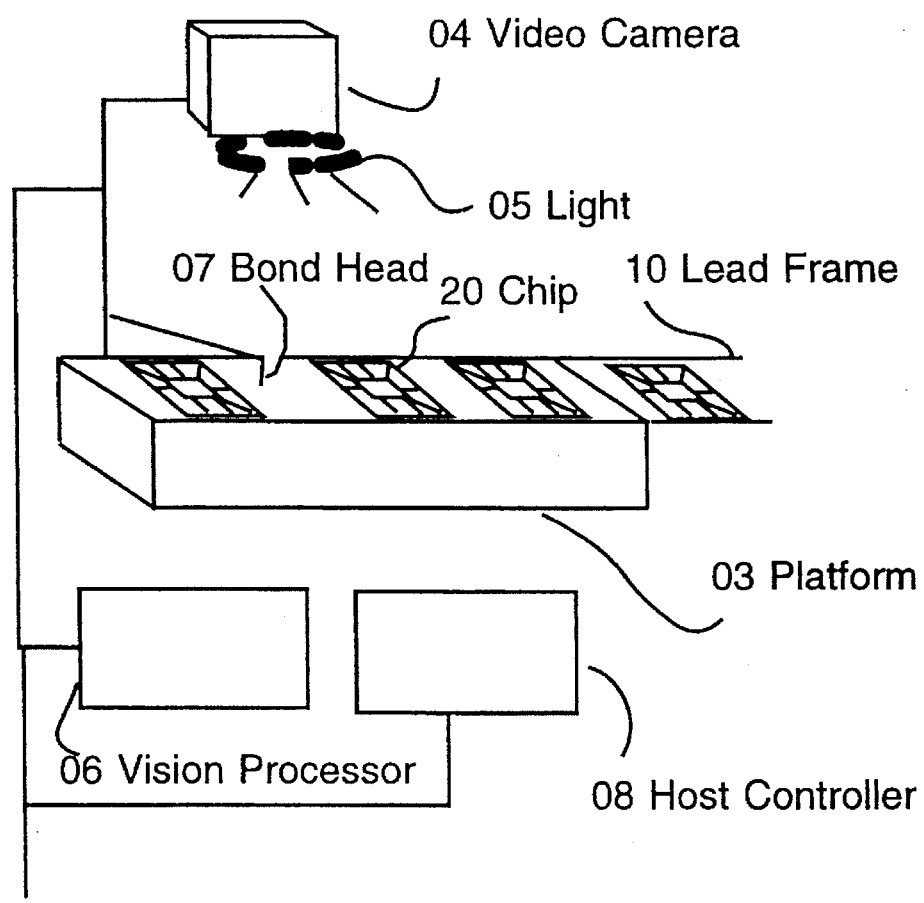
FIG. 1 is an illustration of a system incorporating the present invention.

In FIG. 1, a system incorporating the present invention is shown. The system includes a movable platform 03 such as an X-Y table for holding semiconductor chips 20 situated in lead frames 10; a video camera 04 or other optical sensing device for generating images, which is typically positioned over the target chip and lead frame to be bonded; illumination means 05 for illuminating a chip 20 in a lead frame 10; an image processor 06, capable of digitizing and analyzing the optically sensed images; bonding mechanism 07; and host controller 08 electronically connected to bonding mechanism 07, movable platform 03, video camera 04 and image processor 06.

Figure 2:
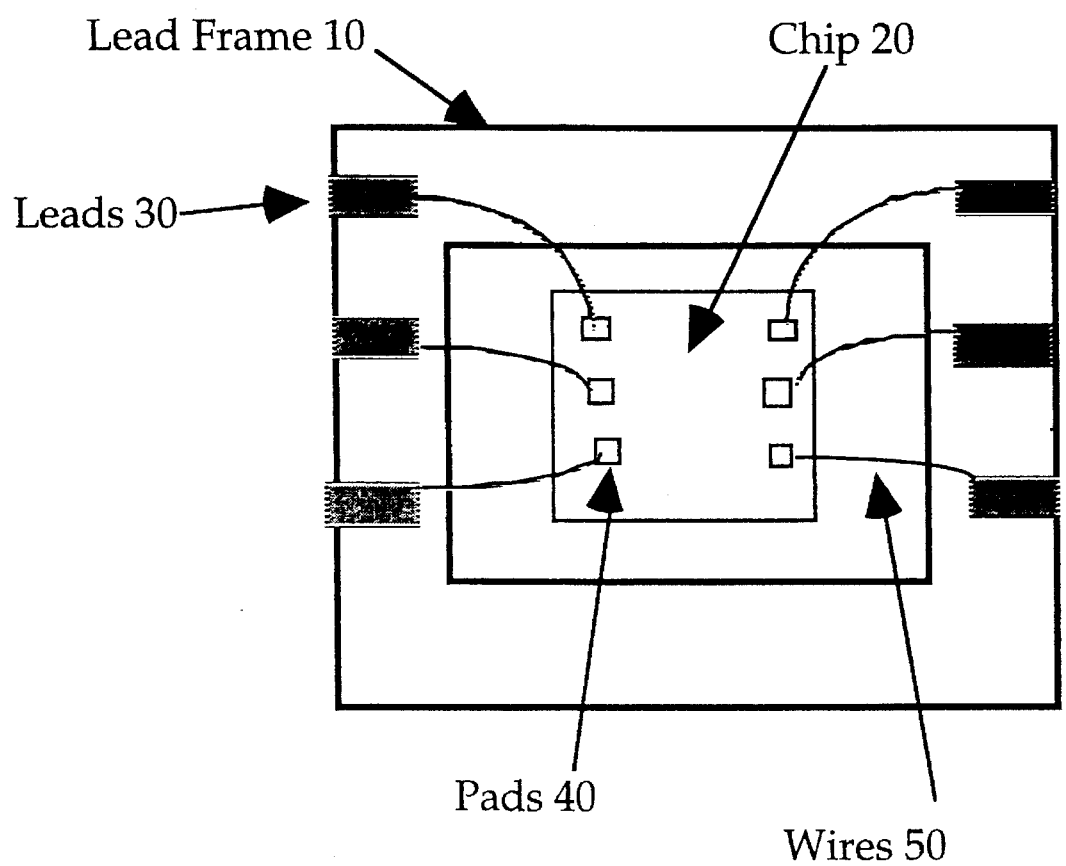
FIG. 2 is a diagrammatic view, taken from above, of a semiconductor chip or die in a lead frame.

FIG. 2 depicts a top view of a semiconductor chip 20, in a lead frame 10, having pads 40, and leads 30. The wire bonding process bonds a conductive wire 50 between each pad on chip 20 and its respective lead 30 on lead frame 10.

Figure 3:
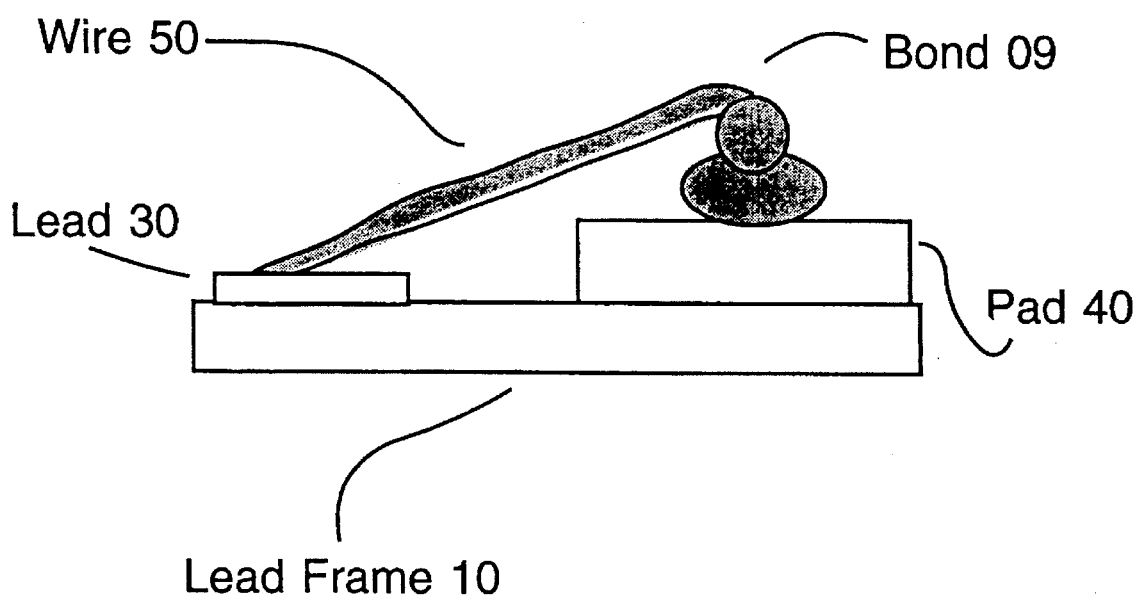
FIG. 3 shows a side view of a bond formed on a pad.

FIG. 3 shows a side view of a bond 09, connecting a pad 40, to a lead 30, on a lead frame 10 by a wire 50. In a typical wire bonding device, a wire or filament is extruded by the bonder and deposited on the die pad and extended to the lead frame, where the wire is also affixed, to form an electrical connection.

Figure 4:
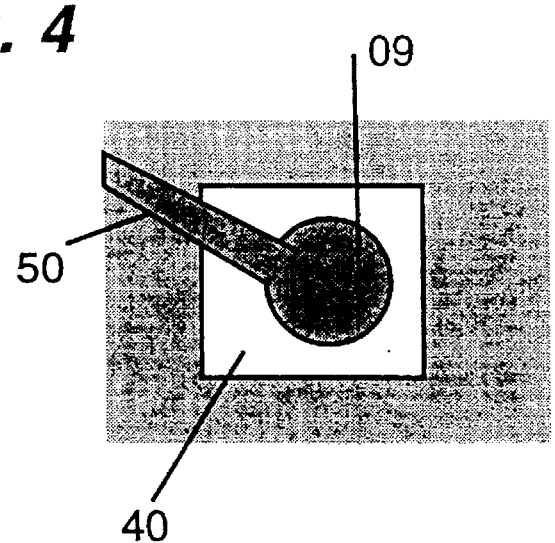
FIG. 4 shows a top view of grey level image of a bond formed on a pad.

FIG. 4 shows a schematic top view of a digitized grey level image of a bond 09, formed on a pad 40, on a chip 20. As can be seen, wire 50 extends outward at an angle from bond 09. In addition, pad 40 also appears as part of the digitized grey level image. A subtractive image of a bond 09 is created by the methods and apparatus of co-pending applications. Essentially, an image of pad 40 before bonding occurs is saved and subtracted from the image of pad 40 after bonding occurs. Some of the blemishes are thus removed from the resulting subtractive image.

Figure 6:
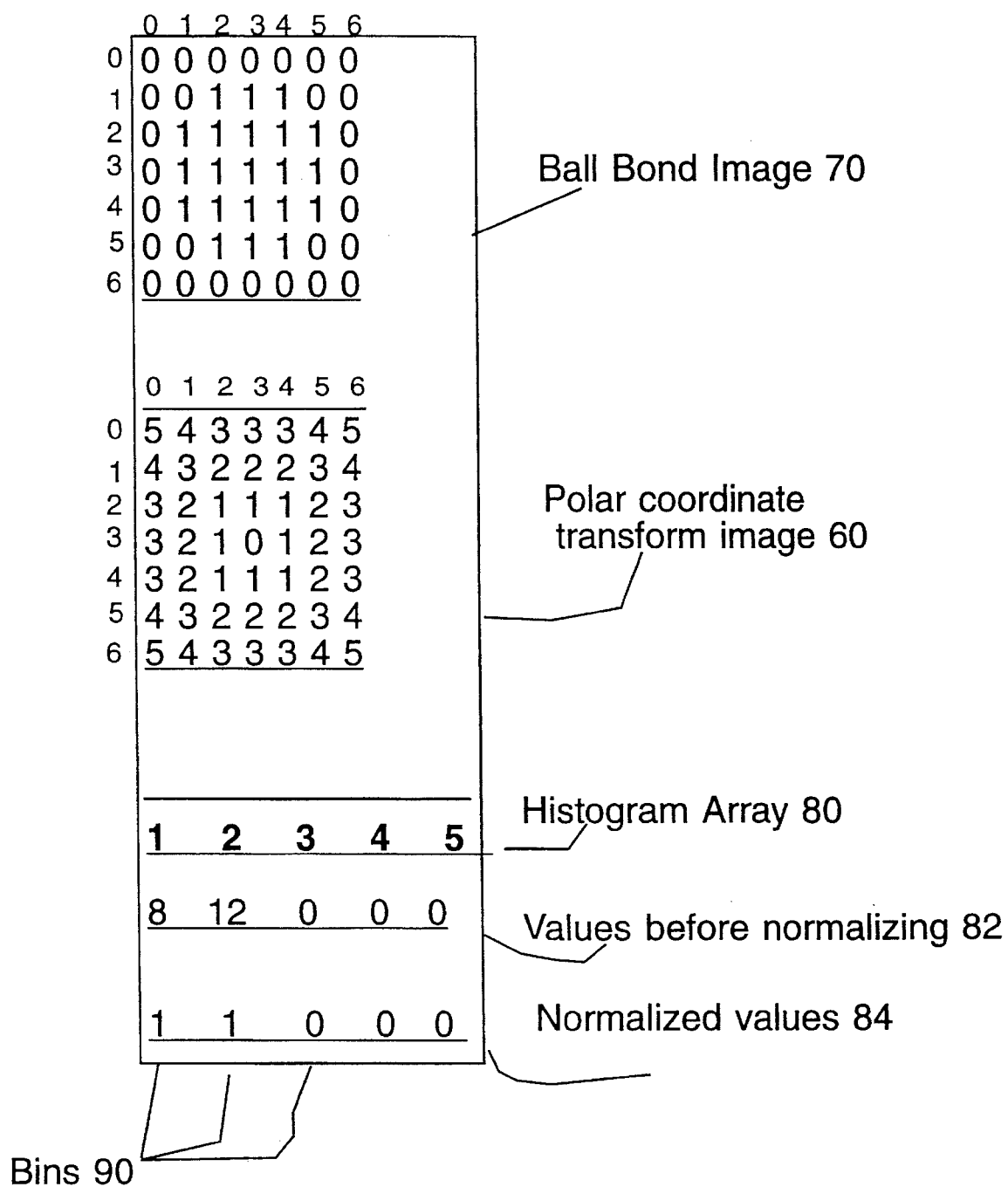
FIG. 6 shows an illustrative polar coordinate transform image and storage array created according to the method and apparatus of the present invention.

In a preferred embodiment of the present invention, a setup operation is performed before the actual wire bonding process begins. In the setup operation, a polar coordinate transform image 60, as illustrated in FIG. 6, is created. A polar coordinate transform image 60 is created with a maximum image size and radius value that is at least equal to the maximum expected size of the ball bond to be measured.

The polar coordinate transform image 60 (It) is constructed as follows. First the center of the transform is chosen; this is xc,yc. It does not have to be the center of the image. The value of each x,y pixel in the transform image It is calculated by the formula:

$$It(x,y) = \sqrt{(x-xc)^2 + (y-yc)^2}$$

Each pixel value is the euclidean distance from the center of the transform to the x,y pixel. Since the pixel values represent histogram bin addresses, they must be whole integers. This is accomplished by rounding the values in the above calculation to the nearest whole integer. FIG. 6 illustrates an example of a 7×7 polar coordinate transform image 60 with a maximum radius of 5 and the center of the transform in the center of the image.

Also shown in FIG. 6 is a histogram array 80 for storing results created with indexes in the range from 0 to the maximum radius that is specified in the transform image.

In a preferred embodiment of the present invention, a polar coordinate transform image 60b having multiple segments is created, as will be described later.

A set of candidate nominal ball center locations are chosen to create a set of candidate ball bond images 70. The strategy for selecting the number of candidates depends on the range of uncertainty of a given nominal center point (with respect to the actual ball center) and the amount of accuracy and speed required. For example, if the known inaccuracy of the given nominal ball center location is ±10 pixels, one strategy could apply the projection in a window that is 20×20 centered at the nominal point. This covers the full range of inaccuracy.

Any of a number of different strategies can be used to evaluate the window. In the example of a 20×20 window, an exhaustive approach would evaluate every possible location in the image. This is the simplest strategy, but also the most time consuming.

In a preferred embodiment of the present invention, polar coordinate transform image 60 is applied on every other pixel to get an approximate location of the ball center. Once that has been found, polar coordinate transform image 60 is run on all the points surrounding the approximate locations. In the case of the 20×20 example, the exhaustive approach would require 400 applications of the polar projection, while the alternate approach would require only 10×10+9, or 109 applications to locate the center. The alternative approach can be generalized depending on the frequency of edges in the image. For example, sampling can be done every three or four pixels, rather than every other pixel. The particular strategy chosen determines where and how many times the image transform and histogram accumulation will be done.

Figure 7:
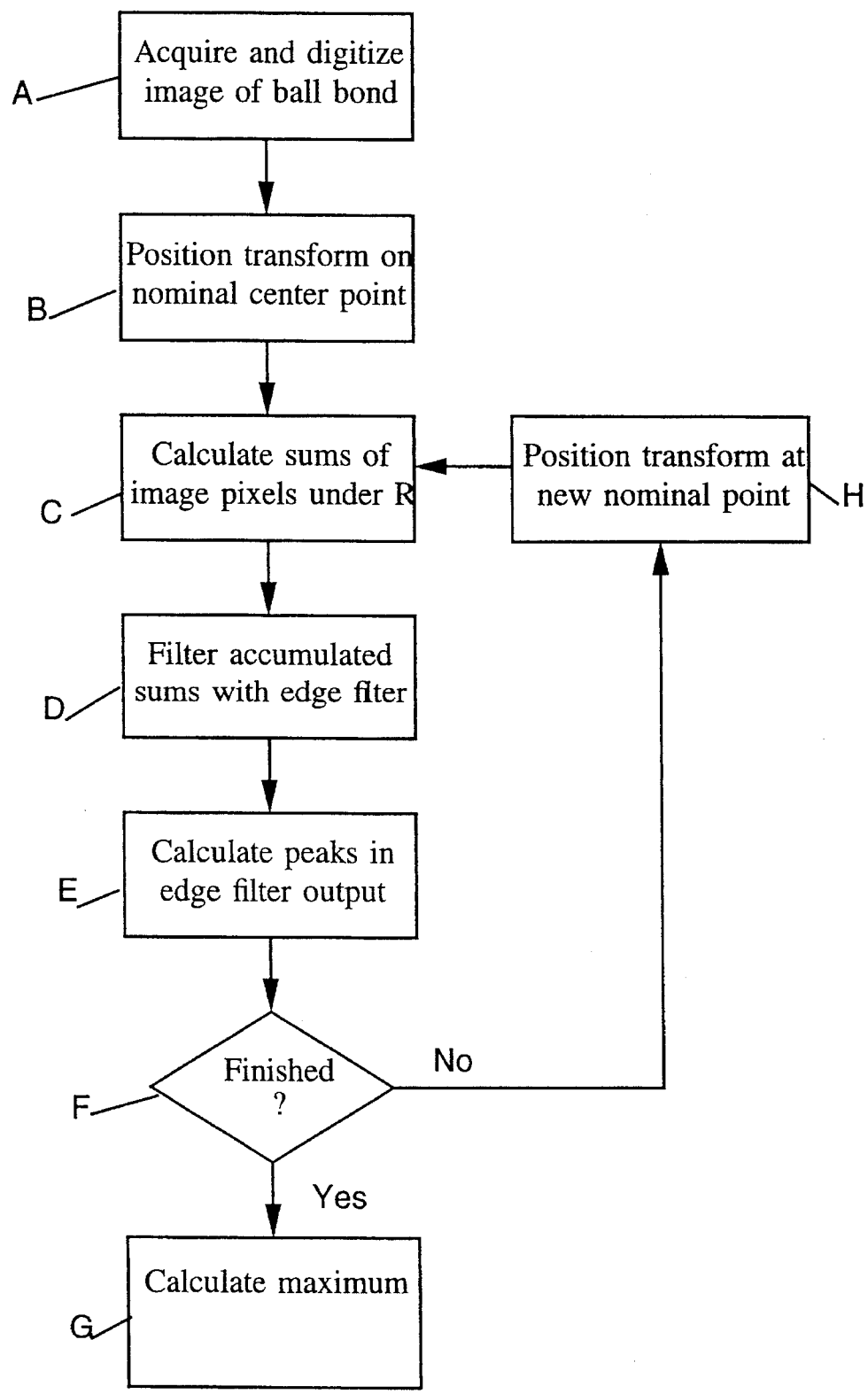
FIG. 7 is a flow chart illustrating the steps performed by the present invention.

FIG. 7 shows the general flow of steps performed in a preferred embodiment of the present invention. First, at step A, an image of a ball bond 09 is acquired and digitized by image processor 06. Video camera 04 is used to acquire the image. Video camera 04 is typically mounted on the bonding equipment such that the camera can be moved to various locations on chip 20. Often, as a result of imaging size limitations, only a few ball bonds 09 will fit into one field of view on video camera 04. Depending upon the particular application, a correct magnification must be chosen so that the ball bond image appears large enough so that there are enough pixels to make an accurate measurement. The focus of the image also effects the accuracy of the measurements. Techniques for setting the correct magnification and focus are well known to those skilled in the art.

Once the image is acquired, it is digitized and stored in memory accessible to the image processor 06. Each picture element or pixel represents sampled image data at a specific x,y location in the image. Again, any of a number of techniques for digitizing and storing images are well known to those skilled in the art.

In a preferred embodiment, the methods and apparatus of the first three of the above referenced co-pending applications are used to locate the bond within the digitized image, by creating a difference or subtractive image of the bond. In a preferred embodiment methods and apparatus described in another co-pending application referenced above (Using Cone-Shaped Search Models) are used to help in locating the bond within the digitized image, and to provide a nominal center location for the bond.

Referring again to FIG. 7, at Step B polar coordinate transform image 60 is aligned so that its center is aligned with that of a first nominal center. Since the digitized image containing the ball bond which has been acquired is larger than the polar coordinate transform image 60, a window into the digitized image that is exactly the same size as polar coordinate transform image 60 must be created. Each x,y coordinate of a candidate ball bond image 70 thus created (as shown in FIG. 6), then corresponds to an x,y location in polar coordinate transform image 60.

In one embodiment of the present invention, the nominal ball center location is also referred to as the application point. This application point, or ball center candidate in the intensity image is aligned with the center of the polar coordinate transform image 60.

In Step C shown in FIG. 7, the present invention calculates sums of image pixels in the first candidate ball bond image 70, and stores the results in a histogram array 80. Returning to FIG. 6, it can be seen that polar coordinate image transform image 60, contains values arranged in rows and columns. These values correspond to bins 90 or index values in histogram array 80.

In a preferred embodiment, polar coordinate transform image 60 and candidate ball bond image 70, are evaluated simultaneously in raster scan order in Step C of FIG. 7, with each pixel being accessed just once, to generate an output polar projection histogram. Referring back to FIG. 6, each pixel value at location x,y in ball bond image 70 is summed into histogram array 80 indexed by the pixel value at location x,y in polar coordinate transform image 60.

For purposes of illustration only, if ball bond image 70 contains the pixel values shown in FIG. 6, the method and apparatus of the present invention will select a first pixel value at location 0,0 in ball bond image 70, add its value to bin 5 of histogram array 80, as indicated by the index value 5 located in polar coordinate transform image 60 at location 0,0. The next pixel in ball bond image 70 at location 0,1 will be summed into bin 4 of histogram array 80, and so on, until the entire candidate ball bond image 70 has been evaluated.

The resulting output that is created in this step is a one dimensional projection array or histogram array 80, (as shown in FIG. 6) in which each array element or bin 90 contains the sum of all of the pixel values that fall under that bin 90's index value in polar coordinate transform image 60. Conversely, to find the sum of all image pixel values at a radius R, in polar coordinates, one looks at the value stored in histogram array 80 at index R. In the illustration in FIG. 6, with a 7 pixel by 7 pixel polar coordinate transform image 60, the value in histogram array 80, in the fourth bin 90 will contain the sum of all of the corresponding image pixels in the ball bond image 70 that were evaluated under the polar coordinate transform image 60 pixels that had a value of 4.

In a preferred embodiment, Cognex Corporation's VC-1 image processing chip, described in applicant's Assignee's U.S. Pat. No. 4,972,359, is used in image processor 06 illustrated in FIG. 1, to create the polar projections with maximum speed. Using this image processing chip, an entire projection can be done in the time that it takes to access ball bond image 70 and polar coordinate transform image 60 pixels from memory.

Once the polar projection is accumulated in histogram array 80, the values in histogram array 80 are sums of the intensity pixels in ball bond image 70. These values 82 are not yet usable by the following steps of the present invention. The values 82 in the histogram array must be normalized by the number of times the values occur in the transform image.

For example, using the 7×7 polar coordinate transform image 60 and ball bond image 70 illustrative examples in FIG. 6, the number of pixels of ball bond image 70 that will be summed into the 1 bin is 8, whereas the number of pixels that will be summed into the 2 bin is 12. As the radius gets larger, each successive radius bin has a larger number of samples that are added into it. To normalize these, the value 82 in each histogram bin 90 is divided by the total number of pixels being summed into that bin. This can be easily done by counting the number of occurrences of a radius value in polar coordinate transform image 60. The resulting normalized numbers 84 in the projection histogram array 80 now represent the average pixel values at a given radius from the center of candidate ball bond image 70 rather than the sum of the pixel values.

As the radius gets larger and larger, more samples are averaged into the histogram bins 90. The more samples there are, the more statistically accurate the average pixel intensity is. As a result, polar projection is more accurate for larger radiuses than for smaller ones.

FIG. 8 shows a plot of the polar projection of a nominal ball center location having its center closely aligned with the center of the ball bond. This plot is normalized.

One of the major problems with trying to locate ball bond edges in an image are the large number of confusing edges that are present in the images. These are due to the presence of the circuitry, probe marks and bond pads in the image. The polar projection technique of the present invention avoids detecting confusing edges because it has a tendency to only detect circular objects in the image. A polar projection of a square object such as a bond pad tends to blur the projected pad edge since it does not correspond to the projection images circular pattern. The pad edge does not show-up as a sharp edge in the filtered projection array.

In order to locate positions in the projection histogram where the average pixel intensity changes rapidly, edge filtering is performed on the data as indicated in Step D of FIG. 7 to create a first derivative. In a preferred embodiment edge filtering involves convolving the normalized projection histogram array 80 with a first derivative or operation kernel of the following form: +1, 0, −1, to create a first derivative. The actual size of the kernel or operator can be varied to match the expected slope of the ball edge intensity profile. A larger first derivative kernel would look like: +1, +1, +1, 0,—1,−1, −1. Edge filters known in the art can also be used to accomplish low pass filtering as well as an edge detection. Because of the opposite polarity of the signs on either side of the kernel center, used in this embodiment, the filtering is direction sensitive. A transition from low to high (dark to light) will generate an output peak that has a positive polarity. A transition form high to low will generate a negative peak.

It will be apparent to those skilled in the art that any of a number of one-dimensional edge filters may be used, depending on the application requirements. The simple "boxcar" filters described above are used in a preferred embodiment for computational simplicity and speed. If higher levels of accuracy are required, other low pass filters such as a Butterworth or Hamming filter known in the art can be used.

FIGS. 8 and 10 show the normalized projection histograms of likely nominal ball center locations before and after the filtering operation.

Turning again to FIG. 7, at Step E, the peaks in the edge filter output are calculated. Peak detection of the filtered, normalized projection data involves locating local maxima in the data. These points are then stored in a list for reference later, after all of the candidate ball center locations for the transform are exhausted. The local maxima or peaks in the filtered data are points at which the slope of change in average pixel intensity is maximum.

The height of-the peaks indicates how high the contrast of the ball edge is. The higher the contrast is, the more likely it is to be the correct ball edge. As shown in FIGS. 8 and 9, the peak is maximum when the center of the ball bond corresponds to the center of the transform image. As the centers move further away from each other, the ball edge contributes to several different radius bins around the circle, thus blurring the edge contrast.

According to the present invention, once a nominal ball bond image 70 has been analyzed, the system checks to see if a next nominal ball center location exists. In FIG. 7, this is illustrated at Step F. The number of nominal ball center locations depends on the accuracy required. The closer the polar coordinate transform image is to the center of the actual ball center, the more accurate the radius measurement will be. It is the most time consuming to apply the polar projection at every point in a larger, say 20 by 20 window. If less accuracy were needed, every other nominal center could be skipped.

In a preferred embodiment, narrowing down the center location can be done by applying the polar coordinate transform image 60 at sampled points in the digitized image first to obtain a coarse location and then applying it at finer resolution points only around the approximate center found by the coarse search. This has the advantage of speed and accuracy.

If the number of potential ball center locations has been exhausted, the maximum peak value is calculated from the list of peaks detected and stored in Step E. Any of a number of ways known to those skilled in the art can be used to accomplish this.

Once the maximum peak is known, it is taken to be the radius of bond 09 and is used to calculate the center of bond 09.

Figure 5:
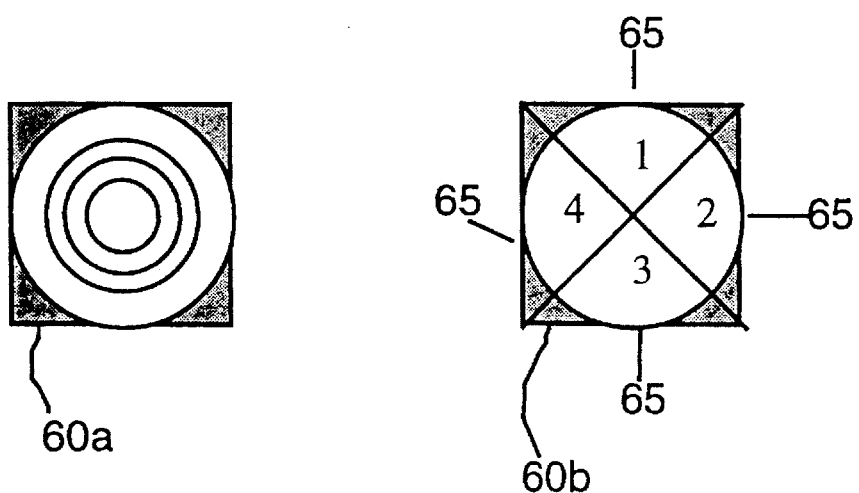
FIG. 5 is a schematic drawing of two variants of a polar coordinate transform image, one unsegmented and one segmented.

If multiple segments 65 were created in the polar coordinate transform image 60, as shown in FIG. 5, additional computations can be done to measure dimensions of an elliptical bond, for example, in the x and y directions.

As shown in FIG. 5, a polar coordinate transform image 60*b* having segments 65 can be created to provide additional information about the dimensions of the bond. Here the polar coordinate transform image 60 is broken into segments 65 in the X and Y directions to allow the calculation of different ball bond diameters in the X and Y direction. This is an advantage because ball bonds are not always perfectly circular and one inspection criterion often required is to report the size difference in X and Y.

The primary difference between using multiple segments versus only one segment is in the way that a polar coordinate transform image is constructed For multiple segments 65, quadrants can be constructed as shown so that the pixel values in the image are different for the four quadrants even though the radiuses or radii are the same. In this embodiment, four different polar projections are created where each projection is the sum of the radiuses though a 90 degree arc of the circle. This can be done by first generating a first segment 65 and then adding a constant value to pixels that are in a different segment 65. For example, if the maximum radius in the transform image were 32, then pixels in first segment 65 would have 0 added to their values, second segment 65 would have 32 added to its pixel values, third segment 65 would have 64 added to its pixel values and fourth segment 65 would have 96 added to its pixel values. Thus one can still proceed as above by accessing each pixel in the image only once, but generating four different polar projections in one pass. The values in the projection array from 0 to 32 would be for the first segment 65. The values form 33 to 64 would be for second segment 65 and so on.

The same filtering and peak detection as above can be done for each quadrant.

An advantage of using multiple segments 65, such as quadrants, is that the four radiuses detected can be used as a means to center the polar coordinate transform image faster than exhaustively applying it to every point. The radius information indicates how far from the ball center the nominal ball center was. The goal for centering is to have each radius be equal in X and Y.

When the center of a ball bond 09 has been located according to the method and apparatus of the present invention, and its size calculated, this information is passed, together with any information about x and y dimensions requested, to a host controller 09 for appropriate action. Depending on the results, chips may be rejected for defects or marked for further work or encapsulated or sent to the next step of assembly.

Those skilled in the art will appreciate that the embodiments described above are illustrative only, and that other systems in the spirit of the teachings herein fall within the scope of the invention.

A preferred embodiment of the present invention also includes a camera or other device for generating a video or image signal. The video signal generated by the camera is typically converted from analog to digital by techniques well known in the art and sent to an image memory, such as a frame grabber, or similar device for storing images. A vision processor system, which includes a computer central processing chip, and input/output capabilities, is coupled to the image memory and is used to perform image processing and analysis according to the present invention. Portions of image processing and analysis are accomplished by software programs controlling the vision processor system, or, as will be evident to one skilled in the art, can be controlled by equivalent circuits created in special integrated circuit chips. The results of image processing and analysis are transmitted electronically to the apparatus or system requiring the machine vision results. Alternatively, the machine vision function can be incorporated within and work as part of a larger system.

What is claimed is:

1. In a machine vision system having a means for optically sensing objects and digitizing and analyzing images of said objects, a method for automatically measuring the size and position of a ball bond, comprising the steps of:

a. constructing a polar coordinate transform image (It) having a center located at xc, yc and an image size and radius value at least equal to the maximum size and radius values of an expected ball bond to be measured, wherein the intensity of the pixels in the polar coordinate transform image are defined by the following formula:

$$It(x,y) = \sqrt{(x-xc)^2 + (y-yc)^2} \; ;$$

b. creating an array in which to store results, said array having a number of elements equal to the maximum radius size of said expected ball bond image, wherein each element has an index, each index corresponding to it particular pixel intensity of the polar coordinate transform image, said indexes ranging from zero to said maximum radius size;

c. specifying a number of potential ball center locations to be evaluated within a digitized image;

d. acquiring a digitized image of a ball bond during a bonding process;

e. storing said digitized image of said ball bond as an intensity image in which pixels are assigned grey level values corresponding to intensities optically sensed from said ball bond object;

f. receiving a potential ball center location;

g. aligning the center of said polar coordinate transform image with said potential ball center location so that each x, y coordinate of a ball bond image having said potential ball center location corresponds to an x, y location in said polar coordinate transform image;

h. evaluating said potential ball center location and said polar coordinate transform image simultaneously, whereby each pixel value in said ball bond image having said potential ball center location is summed into a corresponding element of said array indexed by the pixel value at the corresponding x,y coordinate in said polar coordinate transform image, such that a one-dimensional histogram is created and stored in said array;

i. applying an edge filter to locate peaks in said histogram and store the values thereof;

j. selecting a next potential ball center location, and applying steps g through i to said next potential ball center location, until the specified number of potential ball center locations is exhausted;

k. locating the maximum peak in said array of said histograms, such that the x,y coordinates of said maximum peak are identified to said machine vision system as the center of said ball bond and the location of said maximum peak within its corresponding histogram as the radius of said ball bond.

2. The method of claim 1, wherein the step of constructing a polar coordinate transform image further comprises the step of dividing said polar coordinate transform image into n segments by adding a first constant pixel value to pixels in a first segment, a second constant pixel value to pixels in a next segment, and continuing until n segments have been created.

3. The method of claim 2, wherein said step of evaluating said potential ball center location and said polar coordinate transform image simultaneously further comprises the steps of:

a. generating four segments; and b. creating four histograms, each representing one of said segments, such that four radii are located and their respective differences from an expected ball center location can be reported in the x and y directions.

4. In a machine vision system having a means for optically sensing objects and digitizing and analyzing images of said objects, an apparatus for automatically measuring the size and position of a ball bond, comprising:

a. a means for constructing a polar coordinate transform image (It) having a center located at xc, yc and an image size and radius value at least equal to the maximum size and radius values of an expected ball bond to be measured, wherein the intensity of the pixels in the polar coordinate transform image are defined by the following formula:

$$It(x,y) = \sqrt{(x-xc)^2 + (y-yc)^2} \ ;$$

b. a means for creating an array in which to store results, said array having a number of elements equal to the maximum radius size of said expected ball bond image, wherein each element has an index, each index corresponding to a particular pixel intensity of the polar coordinate transform image, said indexes ranging from zero to said maximum radius size;

c. a means for specifying a number of potential ball center locations to be evaluated within a digitized image;

d. a means for acquiring a digitized image of a ball bond during a bonding process;

e. a means for storing said digitized image of said ball bond as an intensity image in which pixels are assigned grey level values corresponding to intensities optically sensed from said ball bond object;

f. a means for receiving a potential ball center location;

g. a means for aligning the center of said polar coordinate transform image with said potential ball center location so that each x, y coordinate of a ball bond image having said potential ball center location corresponds to an x, y location in said polar coordinate transform image;

h. a means for evaluating said potential ball center location and said polar coordinate transform image simultaneously, whereby each pixel value in said ball bond image having said potential ball center location is summed into said array indexed by the pixel value at the corresponding x,y coordinate in said polar coordinate transform image, such that a one-dimensional histogram is created and stored in said array;

i. an edge filter applied to locate peaks in said histogram and a means for storing the values thereof;

j. a means for selecting a next potential ball center location, and evaluating it, until the specified number of potential ball center locations is exhausted;

k. a means for locating the maximum peak in said array of said histograms, such that the x,y coordinates of said maximum peak are identified to said machine vision system as the center of said ball bond and the location of said maximum peak within its corresponding histogram as the radius of said ball bond.

5. The apparatus of claim 4 wherein said polar coordinate transform image further comprises a means for dividing said polar coordinate transform image into n segments by adding a first constant pixel value to pixels in a first segment, a second constant pixel value to pixels in a next segment, and continuing until n segments have been created.

6. The apparatus of claim 5 wherein said means for evaluating said potential ball center location and said polar coordinate transform image simultaneously further comprises:

a. a means for generating four segments; and b. a means for creating four histograms, each representing one of said segments, such that four radii are located and their respective differences from an expected ball center location can be reported in the x and y directions.

* * * * *